United States Patent [19]

Higashimura

[11] Patent Number: 4,955,671
[45] Date of Patent: Sep. 11, 1990

[54] ANTISKID CONTROL DEVICE

[75] Inventor: Hideaki Higashimura, Itami, Japan

[73] Assignee: Sumitomo Electric Industries, Ltd., Osaka, Japan

[21] Appl. No.: 310,829

[22] Filed: Feb. 8, 1989

[30] Foreign Application Priority Data

Feb. 10, 1988 [JP] Japan .................................. 63-29745

[51] Int. Cl.$^5$ .............................................. B60T 8/10
[52] U.S. Cl. ...................................... 303/92; 303/9.63
[58] Field of Search .............................. 303/92, 93, 9.63

[56] References Cited

U.S. PATENT DOCUMENTS

| 2,168,866 | 9/1979 | McNinch, Jr. et al. | 303/92 |
| 3,709,567 | 1/1973 | Van Ostrom et al. | 303/92 X |
| 3,920,280 | 11/1975 | Luhdorff et al. | 303/92 |
| 3,920,284 | 11/1975 | Lane et al. | 303/92 |
| 4,546,437 | 10/1985 | Bleckmann et al. | 303/92 |
| 4,701,854 | 10/1989 | Matsuda | 303/92 |
| 4,814,990 | 3/1989 | Kirstein | 303/92 |

Primary Examiner—Robert P. Olszewski
Assistant Examiner—Matthew C. Graham
Attorney, Agent, or Firm—Wenderoth, Lind & Ponack

[57] ABSTRACT

An antiskid control device is for use with the brake assembly of a motor vehicle. It includes a program for detecting any malfunction of wheel speed sensors of the non-driven wheels. The program is adapted to judge when the non-driven wheel sensors are out of order and to give a signal notifying the abnormality of the sensors, if the wheel speed values detected by the non-driven wheels are kept out of a predetermined range for a predetermined period while the wheel speeds detected by the driven wheel speed sensors are above a predetermined point. Thus, a possible malfunction of the antilock device itself resulting from wrong information transmitted from the troubled non-driven wheel sensors will be identified and prevented.

3 Claims, 4 Drawing Sheets

ANTISKID CONTROL DEVICE

The present invention relates to an antiskid control device which can efficiently operate the brake assembly of a motor vehicle without loss by slip, and, more particularly, to an antiskid control device which includes a program for detecting any malfunction of wheel speed sensors for the non-driven wheels.

A prior art antiskid device is adapted to give a command to relieve the brake force when it detects that any one of the wheels is falling into a locking state. The command activates solenoids for pressure control valves in the wheel cylinder for the locking wheel to open and close the pressure control valves so that the pressure in the hydraulic circuit will drop. When the wheel begins to recover from the locking state, a brake pressure increase command is given to activate the solenoids to open and close the pressure control valves so that the hydraulic circuit will be connected to a hydraulic pressure source. The braking pressure thus begins to rise.

In order to judge whether each wheel is falling into a locking state or recovering from a locking state, it is a common practice to check whether or not the slip speed (which is the estimated vehicle speed minus the wheel speed) has exceeded a predetermined threshold value.

The estimated vehicle speed is calculated from the speed of the faster one of the non-driven wheels or the average speed of the non-driven wheels. The non-driven wheels correspond to the rear wheels of a front wheel drive vehicle or the front wheels of a rear wheel drive vehicle.

If the wheel speed sensors for all the non-driven wheels should get out of order, the antiskid control device will judge that the vehicle is at a stop even if it is actually moving, because no signals are supplied from the sensors for the non-driven wheels, thus executing the antiskid control on the basis of the wrong judgement.

It is an object of the present invention to provide an antiskid control device which obviates the abovesaid shortcomings.

In accordance with the present invention, if the speeds detected by all the wheel detecting means are out of a predetermined range and this state lasts for a predetermined period of time, a signal for indicating that the speed detecting means for the non-driven wheel is malfunctioning will be given.

The wheel speeds detected by the sensors for the non-driven wheels are compared with a predetermined reference value to judge whether or not they are within an acceptable range. If they are out of the acceptable range and this state lasts over a predetermined period of time, it is judged that something is wrong with the wheel speed sensors or their circuits and an abnormality signal is issued. Thus, the antiskid control device according to the present invention will be less likely to make a misjudgement.

Other features and objects of the present invention will become apparent from the following description taken with reference to the accompanying drawings, in which.

Figure 1:
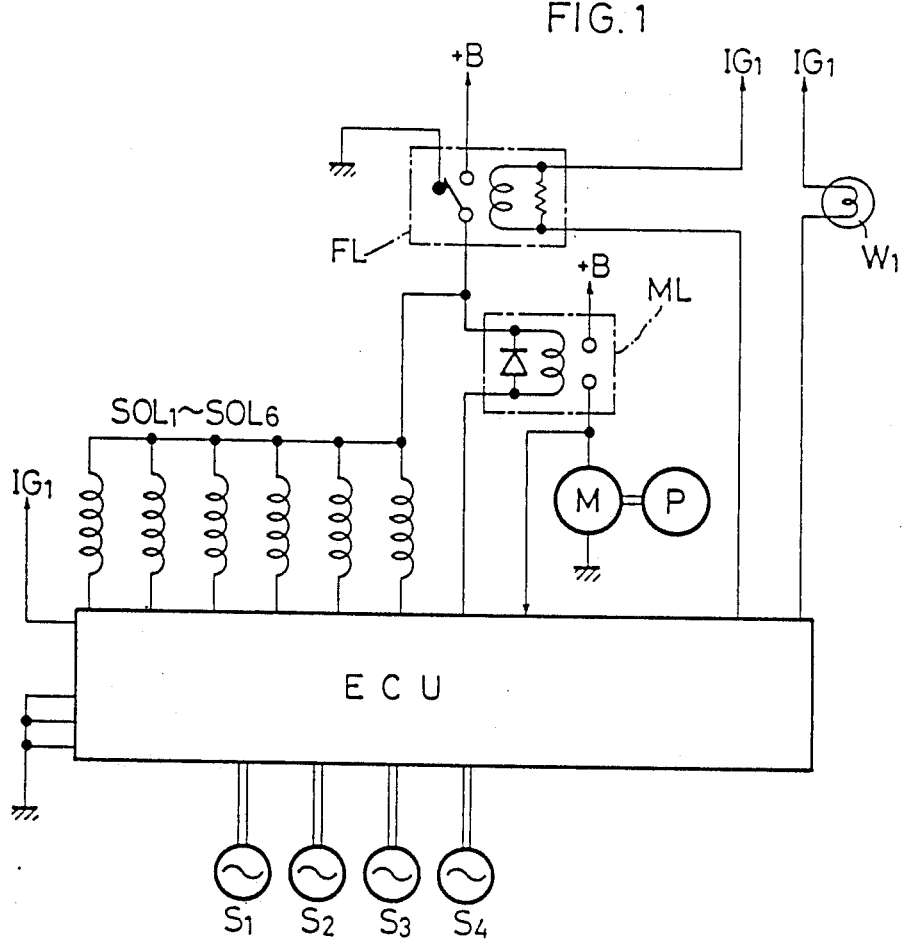
FIG. 1 is an electric circuit diagram of the antiskid control device of the present invention.

As shown in FIG. 1, the antiskid control device according to the present invention has an electronic control unit (hereinafter referred to as ECU). It performs logical operations and decisions on the basis of the signals from wheel speed sensors S1–S4, and activates solenoids SOL1–SOL6 for pressure control valves (not shown) in wheel cylinders for actuating the respective wheel brakes, and opens and closes a relay ML for a motor M for actuating a pump P in a hydraulic unit (not shown). As a result, the hydraulic pressure on the wheel cylinder for each wheel brake is increased, held or reduced. In the preferred embodiment, six solenoids SOL1–SOL6 are used to control the three hydraulic channels, one for the front right wheel, one front left wheel and one for the for both rear wheels, independently of one another.

If a watchdog circuit in the ECU detects any abnormality, it will turn on a warning lamp W1 and open a failsafe relay FL to disable the antiskid control, thus permitting ordinary brake control.

The mark +B denotes a connection to a power source and the mark IG1 denotes a connection through an ignition switch to the power source.

Figure 2:
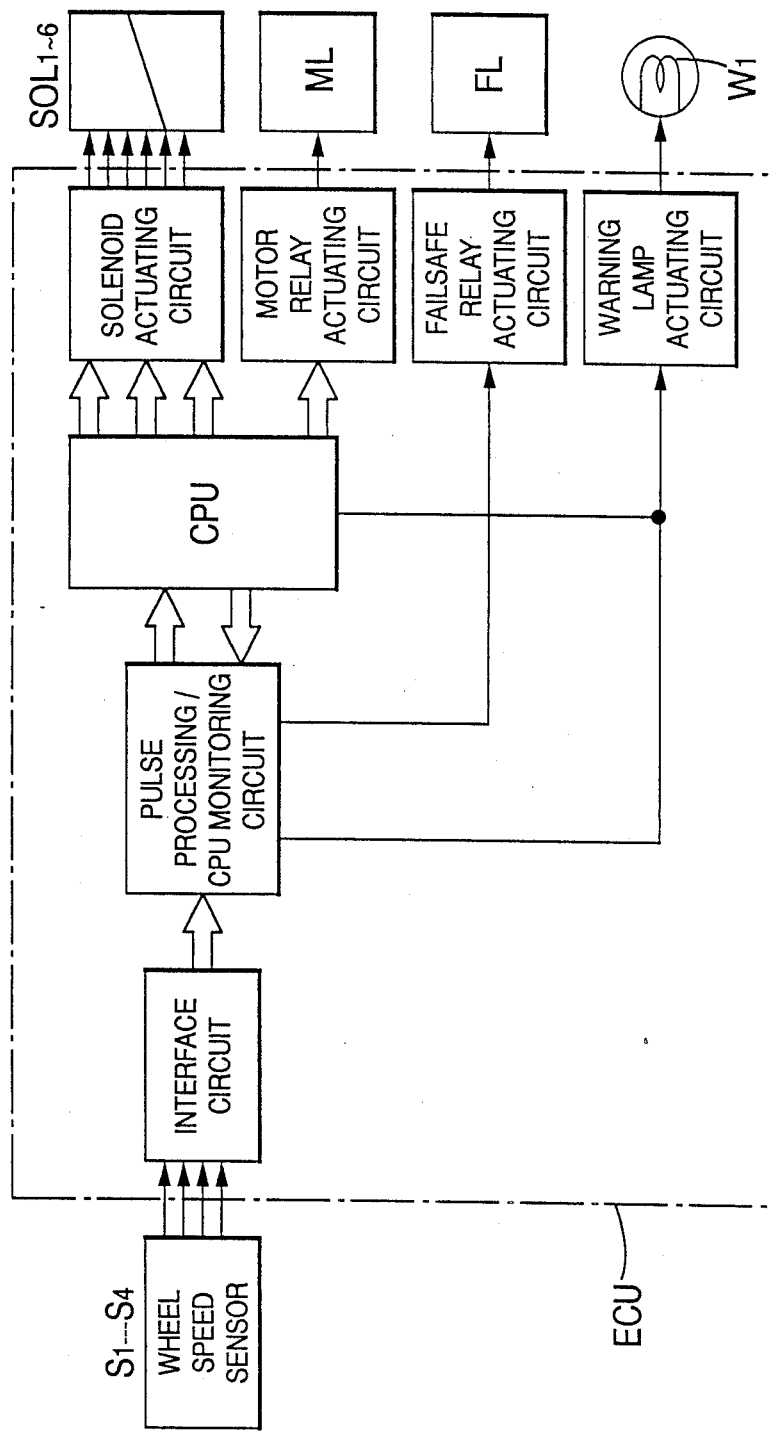
FIG. 2 is a block diagram of the electronic control unit of the same.

As shown in FIG. 2, the output signals from the wheel speed sensors S1–S4, which are AC voltage signals, are converted into pulse signals in an interface circuit and the pulses are counted in a pulse processing circuit. A CPU then computes, analyzes and processes the values thus obtained and, on the basis of the results of operations, actuates the solenoids SOL1–SOL6 for the pressure control valves and the motor relay ML.

The CPU also includes a program for determining the speeds of the non-driven wheels and turning on the warning lamp W1 according to their speeds.

Figure 3:
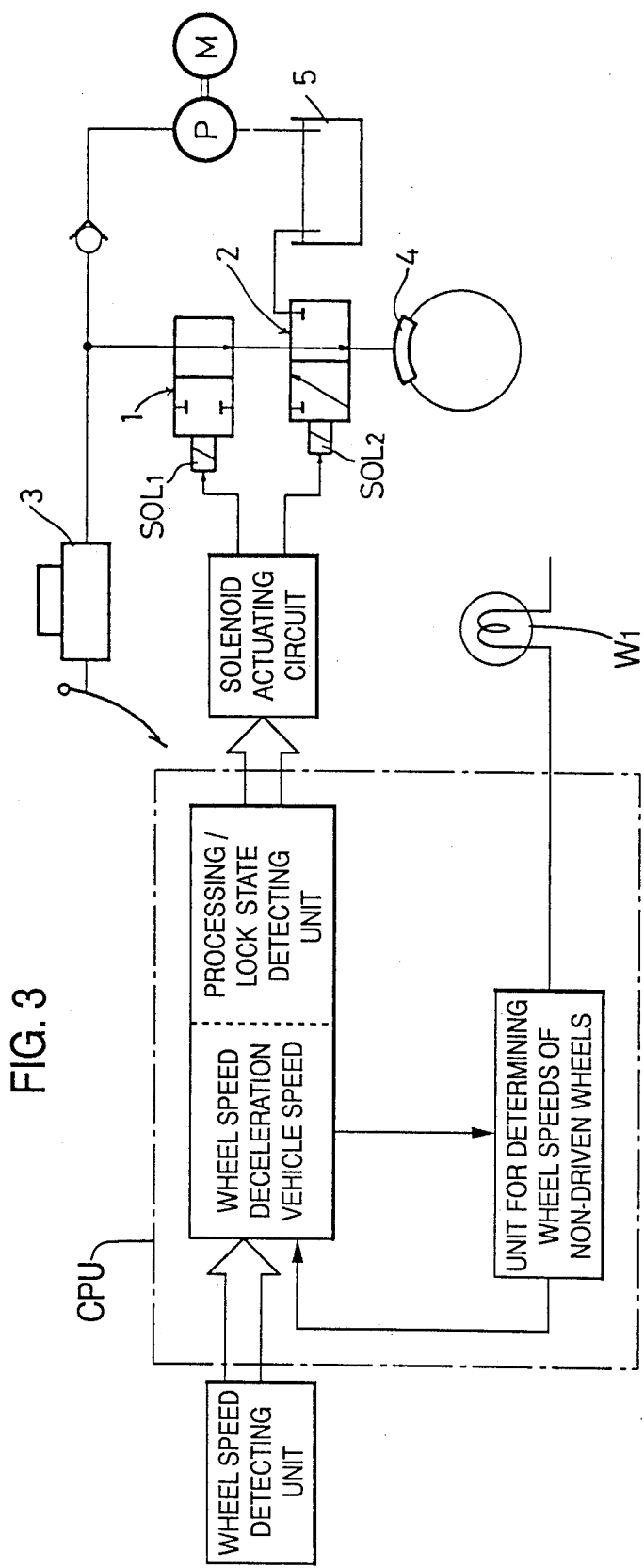
FIG. 3 is a block diagram showing how the electronic control unit is related to the hydraulic circuit.

More specifically, as shown in FIG. 3, the CPU calculates the deceleration and the estimated vehicle speed on the basis of the wheel speed signals supplied from the wheel speed detector unit comprising the wheel speed sensors, an interface circuit, and a pulse processing circuit. A lock tendency detector unit in the CPU judges that a given wheel is showing a locking tendency if the deceleration drops below a predetermined value or if the slip speed (which is the difference between the estimated vehicle speed and the wheel speed) rises above a predetermined value, and gives a pressure reduction command to a solenoid actuating circuit. In response, the solenoid actuating circuit energizes the solenoids SOL1 and SOL2 to move the pressure control valves 1 and 2 to the righthand side in the drawing, respectively. The hydraulic circuit of the wheel cylinder 4 will be cut off from a master cylinder 3 and be put into communication with a reservoir 5, so that the brake pressure will be reduced.

As soon as the wheel speed begins to rise and the deceleration or the slip speed exceeds a predetermined reference value, the lock tendency detector unit will judge that the wheel has cleared out of the locking tendency and commands the solenoid actuating circuit to increase the brake pressure. The solenoid actuating circuit now deenergizes the solenoids SOL1 and SOL2 to allow the pressure control valves 1 and 2 to return to their original position shown in FIG. 3. Thus, the wheel cylinder 4 will be connected to the hydraulic pressure source, increasing the brake pressure.

If it is necessary to give a pressure hold command while the pressure reduction command is being given, the solenoid SOL2 is deenergized while keeping the solenoid SOL1 energized. In this state, the presure control valve 1 will move to the righthand side of the drawing, shutting off the hydraulic circuit. However, the control valve 2 will remain in the original position. The hydraulic pressure in the wheel cylinder 4 is thus held constant.

The above-described brake control may be carried out separately for each of the three channels, i.e. for the front right wheel, front left wheel and both rear wheels. Otherwise, the four wheels may be controlled separately from one another.

To the processing and lock tendency detector unit is connected a unit for judging whether the speeds of the non-driven wheels have been within a predetermined range for a predetermined period of time.

Figure 4:
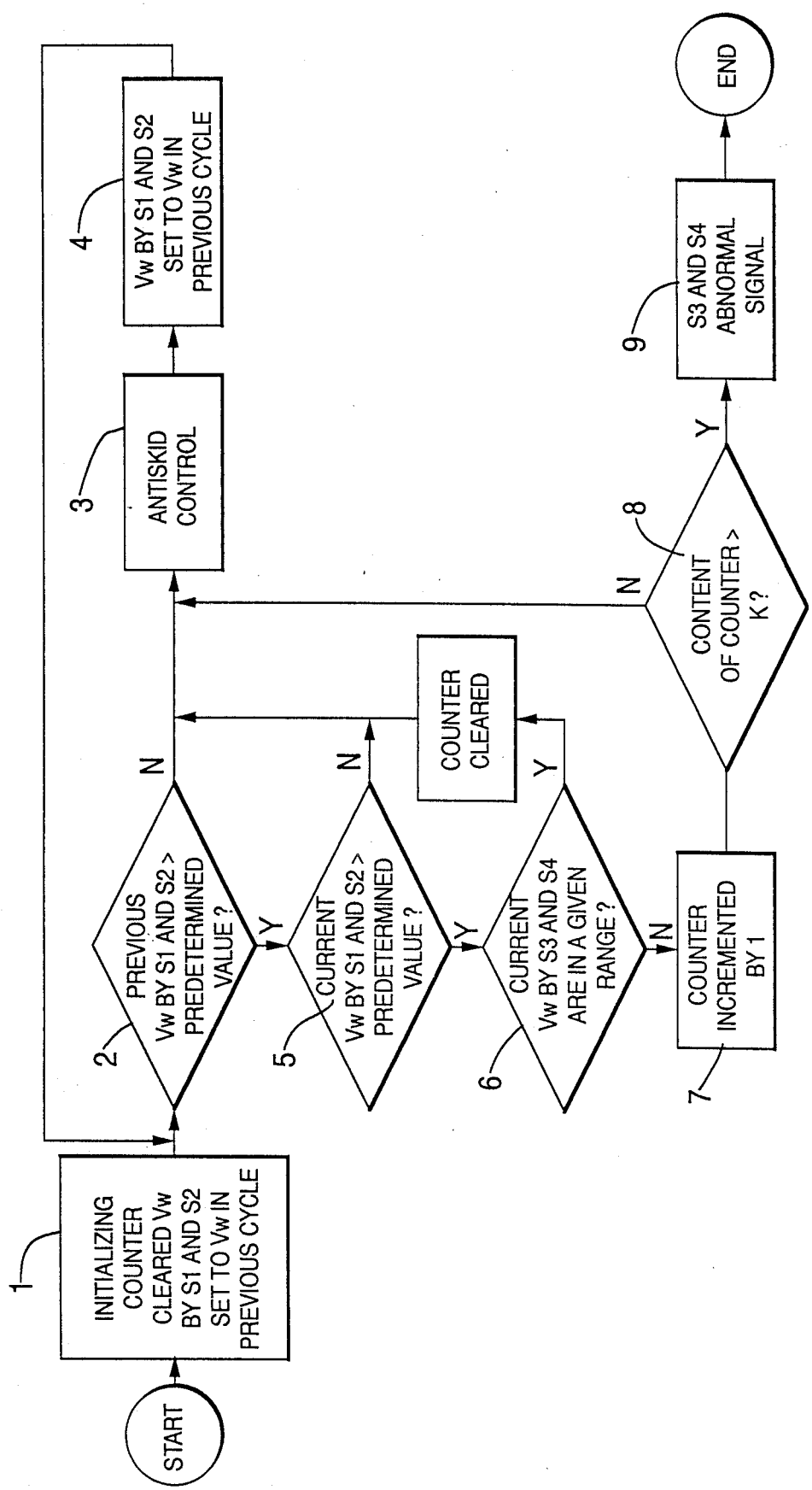
FIG. 4 is a flow chart showing the logic of the wheel speed detector/judgement unit for the non-driven wheels shown in FIG. 3.

Now the operation of the abovementioned detector and judgement units and the antiskid control will be described with reference to the flow chart of FIG. 4.

Let us assume that the wheel speed sensors S1 and S2 are for the driven wheels and the sensors S3 and S4 are for the non-driven wheels.

In Step 1, the program is initialized, a counter is cleared, and the current wheel speeds Vw of the sensors S1 and S2 are temporarily set to the value of the wheel speeds in the previous cycle. In Step 2, it is judged whether the wheel speeds detected by the sensors S1 and S2 are larger than a predetermined value. If not, the program proceeds to Step 3, which corresponds to the processing and locking tendency detector unit.

The program then proceeds to Step 4, where the current wheel speeds Vw from the sensors S1 and S2 are set to the wheel speeds in the previous cycle, and then returns to Step 2.

If judged YES in Step 2, it is judged in Step 5 whether the current wheel speeds Vw from the sensors S1 and S2 are larger than a predetermined value which is the same value as the reference value used in Step 2 and which should be a relatively small value, e.g. 20 km/h.

This means that it is judged in Steps 2, 4 and 5 whether or not the wheel speeds detected by the sensors S1 and S2 for the driving wheels are kept over the predetermined value consecutively.

In Step 6, it is judged whether the current wheel speeds Vw detected by the sensors S3 and S4 for the non-driving wheels are within a predetermined range, which includes zero and which may be 10 per cent of the current wheel speeds of the driven wheels detected by the sensors S1 and S2.

If judged NO in Step 6, the counter is incremented by one in Step 7. The value is compared with a reference value k in Step 8. If the antiskid control routine is repeated in a cycle of 8 milliseconds, the time during which the sensors S3 and S4 are supposed to be out of order is expressed by the content of the counter multiplied by 8 milliseconds.

If judged YES in Step 8, an abnormality signal is given which indicates that the sensors S3 and S4 are out of order (in Step 9). Then, the lamp W1 may be turned on, the failsafe relay FL may be closed to disable the antiskid control device, or other necessary measures may be taken. If judged NO in Step 8, the sensors S3 and S4 and their circuits are judged to be working normally and the program returns to Step 3.

What is claimed is:

1. In an antiskid control device of an automotive vehicle, the antiskid control device having a processing-/lock state detecting means for executing logical operations on the basis of wheel speed signal supplied from a wheel speed detecting unit to determine whether the wheels are entering into a locking state and whether the wheels are recovering from a locking state, and for transmitting signals to reduce, hold and increase a breaking pressure on the basis of the thus executed logical operations, the antiskid control device further including solenoid activating means for actuating solenoids for pressure control valves in hydraulic circuits in response to the signals transmitted from the processing-/lock state detecting means, the improvement comprising a malfunction detecting means for detecting a malfunction of the wheel speed detecting means, said malfunction detecting means comprising:

means for detecting a first state in which a predetermined one of the driven wheels has reached a predetermined speed;

means for detecting a second state in which a difference in wheel speed between said predetermined driven wheel and all of the non-driven wheels has exceeded a predetermined value during said first state;

count timer means for increasing a count thereof during said second state; and malfunction indication means for indicating a malfunction of the wheel speed detecting means in response to said count of said count timer exceeding a predetermined value.

2. An antiskid control device, comprising:

wheel speed detecting means for outputting wheel speed signals indicative of a wheel speed of each driven wheel and each non-driven wheel of a vehicle; and, a sensor malfunction detecting means for periodically reading at control cycle intervals the wheel speed signals output by said wheel speed detecting means, and for detecting a malfunction of said wheel speed detecting means and for outputting an indication of a thus detected malfunction, said indication being output when a wheel speed of said non-driven wheels is indicated by said wheel speed detecting means as being out of a predetermined range for a predetermined period of time equal to one control cycle interval, while a wheel speed of said driven wheels is indicated by said wheel speed detecting means as being higher than a predetermined speed.

3. An antiskid control device as recited in claim 2, further comprising:

a processing and lock state detecting means for determining whether each wheel of the vehicle is entering into a locking state and whether each wheel of the vehicle is recovering from a locking state, and for outputting control signals for controlling a brake pressure of the vehicle in accordance with the thus determined locking state status of each wheel.

* * * * *